United States Patent [19]
Yokoyama et al.

[11] Patent Number: 5,809,231
[45] Date of Patent: Sep. 15, 1998

[54] IMAGE TRANSMISSION SYSTEM

[75] Inventors: Naoki Yokoyama; Ouichi Oyamada, both of Sapporo, Japan

[73] Assignee: Kokusai Electric Co., Ltd., Tokyo, Japan

[21] Appl. No.: 617,423

[22] Filed: Mar. 18, 1996

[51] Int. Cl.⁶ .............................. H03H 1/00; H04H 1/00
[52] U.S. Cl. ..................... 395/200.3; 348/416; 348/421; 348/616; 358/405; 371/2.1
[58] Field of Search ........................... 395/200.03, 200.3, 395/200.77; 364/514 R, 514 A; 371/2.1, 30, 35, 37.1, 38.1, 39.1; 358/404, 405, 433, 434, 135–138, 449, 459, 462, 467; 348/416–616, 421, 469, 390

[56] References Cited

U.S. PATENT DOCUMENTS

| | | | |
|---|---|---|---|
| 4,764,805 | 8/1988 | Rabbani et al. | 358/138 |
| 4,772,947 | 9/1988 | Kano | 358/135 |
| 5,070,402 | 12/1991 | Ishii et al. | 358/135 |
| 5,105,285 | 4/1992 | Miyata | 358/449 |
| 5,157,741 | 10/1992 | Katayama | 358/459 |
| 5,204,740 | 4/1993 | Ishii | 348/416 |
| 5,309,450 | 5/1994 | Kim | 348/469 |
| 5,369,641 | 11/1994 | Dodt et al. . | |
| 5,396,239 | 3/1995 | McMahon et al. . | |
| 5,566,002 | 10/1996 | Shikakura | 358/433 |
| 5,570,202 | 10/1996 | Shishida et al. | 358/405 |
| 5,617,333 | 4/1997 | Oyamada et al. | 364/514 R |

*Primary Examiner*—James P. Trammell
*Assistant Examiner*—Bryan Bui
*Attorney, Agent, or Firm*—Wenderoth, Lind & Ponack, L.L.P.

[57] ABSTRACT

An image transmission system and method for transmitting an image, which has been divided into a plurality of pixel blocks, comprising a transmitting device and a receiving device. The transmitting device includes an information source encoder for dividing an image to be transmitted into a plurality of pixel blocks in an original arrangement, a pixel block dispersing unit for arranging the pixel blocks of the image according to predetermined rules, and a modulator for successively modulating and transmitting the rearranged blocks. The receiving device includes a demodulator for successively receiving and demodulating the blocks transmitted from the modulator, a pixel block rearranging unit for rearranging the received blocks of the image back into the original arrangement according to the predetermined rules, an information source decoder for decoding the pixel blocks, and a pixel data interpolator for interpolating any block which has suffered a transmission error based on blocks adjacent thereto in the original arrangement. Since any block which has suffered a transmission error is interpolated using normal blocks, the original image can be reproduced with high quality by the receiving device.

20 Claims, 5 Drawing Sheets

FIG. 1

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

| 1 | 17 | 33 | 3 | 19 | 35 | 5 | 21 |
|---|---|---|---|---|---|---|---|
| 9 | 7 | 23 | 39 | 37 | 25 | 41 | 11 |
| 27 | 43 | 13 | 29 | 45 | 15 | 31 | 47 |
| 2 | 18 | 34 | 4 | 20 | 36 | 6 | 22 |
| 38 | 8 | 24 | 40 | 10 | 26 | 44 | 12 |
| 28 | 42 | 14 | 30 | 46 | 16 | 32 | 48 |

| 1 | 2 | 3 | 4 | 5 | 6 | 7 | 8 |
|---|---|---|---|---|---|---|---|
| 9 | 10 | 11 | 12 | 13 | 14 | 15 | 16 |
| 17 | 18 | 19 | 20 | 21 | 22 | 23 | 24 |
| 25 | 26 | 27 | 28 | 29 | 30 | 31 | 32 |
| 33 | 34 | 35 | 36 | 37 | 38 | 39 | 40 |
| 41 | 42 | 43 | 44 | 45 | 46 | 47 | 48 |

FIG. 4

| 1 | 17 | 33 | 3 | 19 | 35 | 5 | 21 |
|---|---|---|---|---|---|---|---|
| 9 | 7 | 23 | 39 | 37 | 25 | 41 | 11 |
| 27 | 43 | 13 | 29 | 45 | 15 | 31 | 47 |
| 2 | 18 | 34 | 4 | 20 | 36 | 6 | 22 |
| 38 | 8 | 24 | 40 | 10 | 26 | 44 | 12 |
| 28 | 42 | 14 | 30 | 46 | 16 | 32 | 48 |

மற்றும்/...

IMAGE TRANSMISSION SYSTEM

BACKGROUND OF THE INVENTION

1. Field of the Invention

The present invention relates to an image transmission system and method for transmitting an image which has been divided into blocks, and more particularly, an image transmission system which interpolates any block that has been subjected to a transmission error according to blocks surrounding that block.

2. Description of the Related Art

Conventionally, it has been the customary practice to transmit an image such as a still image in the form of a plurality of divided blocks each composed of a certain number of pixels. Specifically, a transmitting device divides a digitized image into a plurality of blocks and encodes the blocks, and successively transmits the encoded blocks over a radio or wire transmission path. A receiving device successively receives the transmitted blocks, and decodes the received blocks to reproduce the original image. While the blocks are being transmitted, they may be subjected to transmission errors due to an instantaneous interruption in the transmission path, noise, distortion, or the like, and the receiving device may not be able to receive normal block data.

Figure 7:
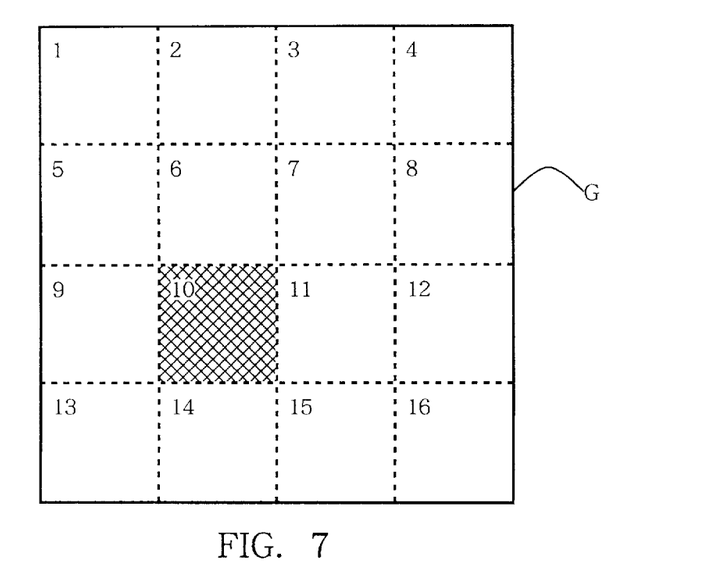
FIG. 7 is a diagram showing the manner in which a random error occurs in a block of an image.
Figure 8:
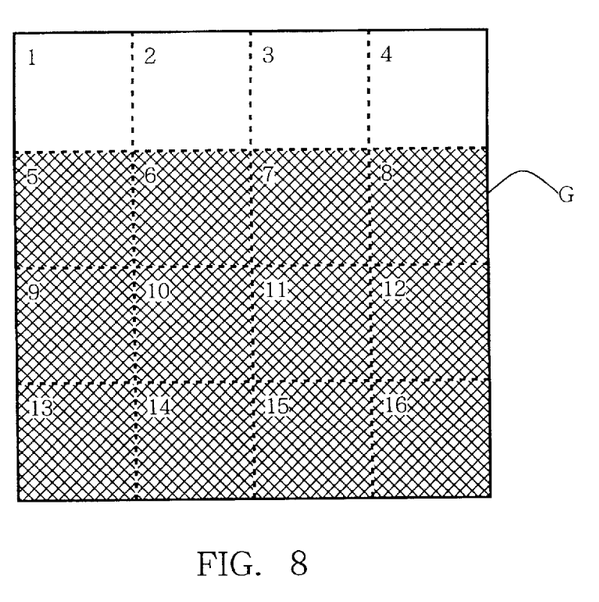
FIG. 8 is a diagram showing the manner in which a burst error occurs in blocks of an image.

The transmission errors which the transmitted blocks may experience are roughly classified into two patterns. One is a random error. As shown in FIG. 7 of the accompanying drawings, when an image G, which is composed of blocks 1 to 16, suffers a random error during transmission, a block 10, for example, which is shown hatched, undergoes the error independently of the other blocks. The other pattern is a burst error. As shown in FIG. 8 of the accompanying drawings, when a block 10, for example, suffers an error, surrounding blocks 5 to 9 and 11 to 16 also suffer errors, as shown hatched. The blocks 5 to 16 now undergo a burst error.

According to one conventional process of correcting such transmission errors, the transmitting device adds an error-detecting code such as a CRC (cyclic redundancy check character) code to the block data and transmits the block data with such an error-detecting code, and the receiving device detects any block which suffers an error based on the error-detecting code and interpolates the detected block based on normal blocks that surround the detected block.

Generally, transmission errors that actually happen are a mixture of random errors and burst errors.

As shown in FIG. 7, when the block 10 has suffered a random error, it is highly likely for the blocks which surround the block 10 to be received normally. The receiving device can reproduce an image which is close to the original image by interpolating the block 10 with the surrounding blocks.

As shown in FIG. 8, however, when a burst error occurs, it is highly likely for the blocks 5 to 7, 9, 11, and 13 to 15 which surround the block 10 that has suffered an error to also suffer an error. The receiving device is then unable to interpolate the block 10 with the surrounding blocks.

Therefore, the interpolation process used for correcting burst errors is not effective and it has conventionally been difficult to reproduce high-quality images from blocks which have suffered burst errors even if the interpolation process is carried out.

SUMMARY OF THE INVENTION

It is an object of the present invention to provide an image transmission system and method which is capable of reproducing original images of high quality through an interpolation process for correcting transmission errors including burst errors.

According to the present invention, an image transmission system for transmitting an image, which has been divided into a plurality of pixel blocks, comprises a transmitting device which comprises a dividing means for dividing an image to be transmitted into a plurality of blocks, a dispersing means for arranging the blocks of the image according to predetermined rules, and a transmitting means for successively transmitting the arranged blocks, and comprises a receiving device which comprises a receiving means for successively receiving the blocks transmitted from the transmitting means, a rearranging means for rearranging the received blocks corresponding to one image back into the original arrangement according to the predetermined rules, and interpolating means for interpolating any block which has suffered a transmission error based on blocks adjacent thereto in the original arrangement.

Further, according to the present invention, there is also provided an image transmission system for transmitting an image which has been divided into a plurality of pixel blocks, comprising a transmitting device which comprises a dividing means for dividing an image to be transmitted into a plurality of blocks and assigning block numbers to each block which identify the original arrangement of the blocks, a dispersing means for arranging the blocks of the image according to predetermined rules, and transmitting means for successively transmitting the arranged blocks with the respective block numbers added thereto, and a receiving device which comprises a receiving means for successively receiving the blocks transmitted from the transmitting means, rearranging means for rearranging the received blocks corresponding to one image back into the original arrangement according to the block numbers, and interpolating means for interpolating any block which has suffered a transmission error based on blocks adjacent thereto in the original arrangement.

In the transmitting device, an image to be transmitted is divided into a plurality of blocks in an original arrangement by the dividing means, the blocks of the image are then arranged according to the predetermined rules by the dispersing means, and the arranged blocks are successively transmitted by the transmitting means. That is, the blocks are placed into an arrangement which is different from the original arrangement of the image, and the arranged blocks are successively transmitted over a transmission path to the receiving device.

In the receiving device, the transmitted blocks are successively received by the receiving means, the received blocks of the image are rearranged back into the original arrangement by the rearranging means, and thereafter any block which has suffered a transmission error is interpolated using normal blocks adjacent thereto. Alternatively, the received blocks of the image are rearranged back into the original arrangement by the rearranging means according to block numbers assigned to the blocks, and thereafter any block which has suffered a transmission error is interpolated using normal blocks adjacent thereto. That is, the blocks arranged in the transmitting device are rearranged back into the original arrangement in the receiving device, and any block of the rearranged blocks which has suffered a transmission error is interpolated using normal blocks adjacent thereto.

As a result, even if a transmission error occurs due to a burst error concentrated on blocks in a certain area of the received blocks, those blocks are rearranged and respectively distributed in separated places in the original arrangement, any block which has suffered a transmission error is to be surrounded by normal blocks. Consequently, any block which has suffered a transmission error can be interpolated using normal blocks adjacent thereto, and the image can be reproduced with high quality even when it is subject to a burst error during transmission.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
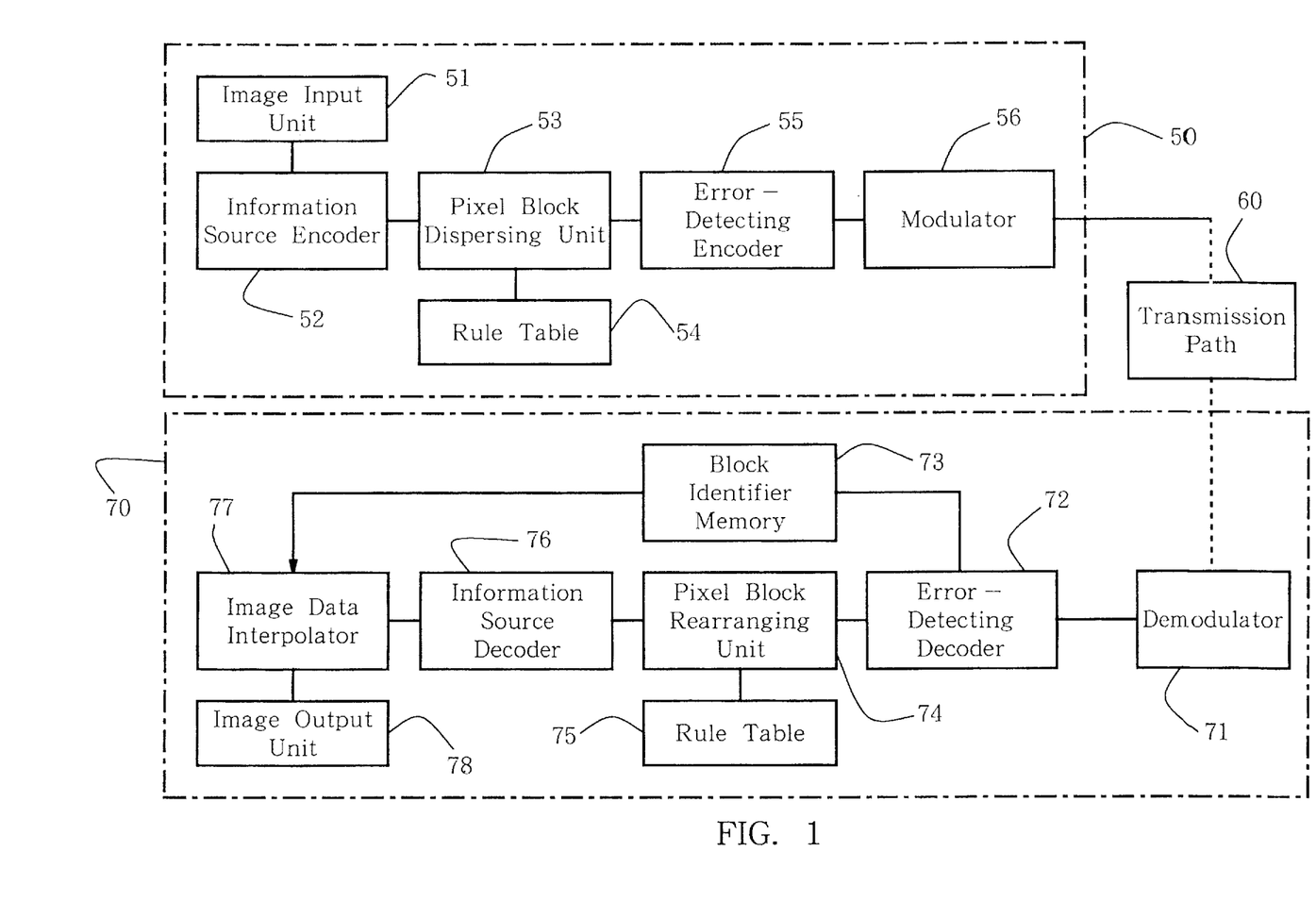
FIG. 1 is a block diagram of an image transmission system according to the present invention.

As shown in FIG. 1, an image transmission system according to the present invention comprises a transmitting device 50 for dividing a still image to be transmitted into a plurality of pixel blocks each composed of 8×8 pixels and transmitting the pixel blocks, a wire transmission path 60 for transmitting the pixel blocks from the transmitting device 50, and a receiving device 70 for reproducing the original still image from the pixel blocks received from the transmitting device 50 over the wire transmission path 60.

The transmitting device 50 comprises an image input unit 51 such as a video camera or the like, an information source encoder 52 for dividing an inputted original still image into pixel blocks and encoding the pixel blocks, a pixel block dispersing unit 53 for arranging the pixel blocks of the original still image according to predetermined rules, a rule table 54 which stores the predetermined rules for arranging the pixel blocks, an error-detecting encoder 55 for adding a transmission error-detecting code such as a CRC code or the like to each of the pixel blocks, and a modulator 56 for modulating each of the pixel blocks into a signal matching the transmission path 60 and transmitting the signal to the transmission path 60.

The receiving device 70 comprises a demodulator 71 for receiving and demodulating the pixel blocks from the transmission path 60, an error-detecting decoder 72 for detecting whether a transmission error has occurred in each of the pixel blocks based on the transmission error-detecting code, a block identifier memory 73 for storing an identifier (block number or the like) of any pixel block in which a transmission error has been detected, a pixel block rearranging unit 74 for rearranging the pixel blocks back into their original arrangement according to the predetermined rules described above, a rule table 75 which stores the rearranging rules, an information source decoder 76 for decoding the pixel blocks, an image data interpolator 77 for interpolating any pixel block which has suffered a transmission error by referring to the data stored in the block identifier memory 73, and an image output unit 78 such as an image display or the like for reproducing the original image from the pixel blocks and displaying the reproduced original image.

Described next is the manner in which the image transmission system, shown in FIG. 1, transmits an image and interpolates any pixel block which has suffered a transmission error.

Figure 2:
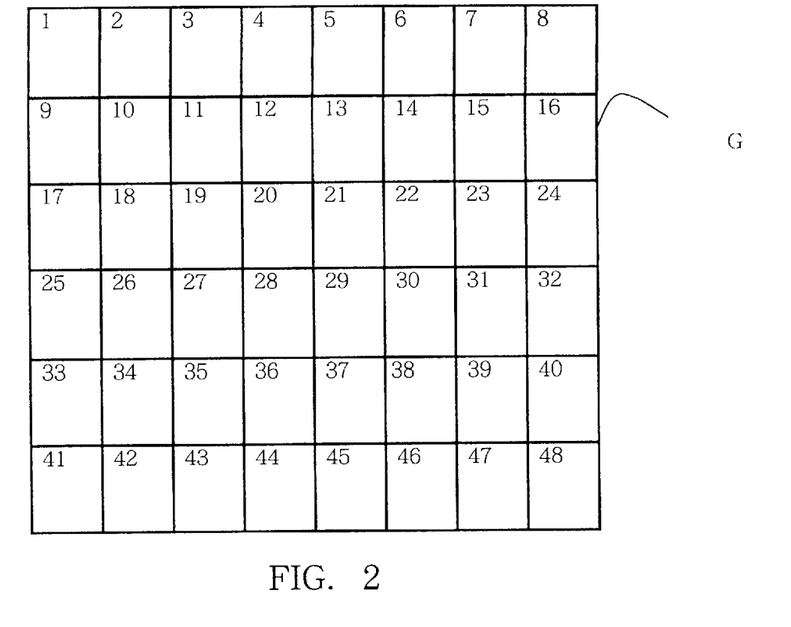
FIG. 2 is a diagram of an arrangement of blocks of an original image.

As shown in FIG. 2, an original image G to be transmitted is divided into 48 pixel blocks for transmission. Specifically, the information source encoder 52 divides the original image G inputted from the image input unit 51 into pixel blocks 1 to 48 that are arranged as shown in FIG. 2, and encodes the divided pixel blocks 1 to 48 according to an encoding process such as DCT (discrete cosine transform) or the like.

Figure 3:
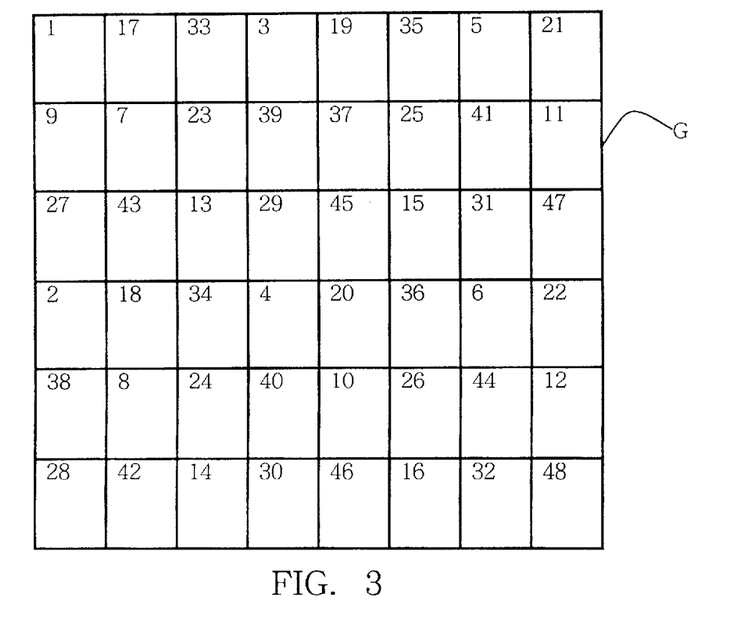
FIG. 3 is a diagram of blocks that have been arranged according to predetermined rules.

The encoded pixel blocks 1 to 48 are dispersed into an arrangement shown in FIG. 3 by the pixel block dispersing unit 53, the arrangement being different from the arrangement shown in FIG. 2 which makes up the original image G.

The encoded pixel blocks 1 to 48 are dispersed according to predetermined rules stored in the rule table 54, such that any pixel blocks which are positioned adjacent to each other in the original image G will not be positioned adjacent to each other, to the extent possible and will be spaced as far away from each other as possible in relation to the order of transmission. In the illustrated embodiment, the pixel blocks that are produced by dividing the original image G with the pixel block dispersing unit 53 are numbered with respective block numbers 1 to 48 rightward along successive rows as shown in FIG. 2. From those pixel blocks, there are selected pixel blocks downwardly successively along every other column and every other row, and the selected pixel blocks are arranged into a matrix or arrangement shown in FIG. 3. Specifically, the pixel blocks numbered with the block numbers 1, 17, 33, 3, 19, 35, 43, 5, . . . shown in FIG. 2 are successively selected, and the selected pixel blocks are arranged rightward along successive rows into a matrix or arrangement shown in FIG. 3 in which the pixel blocks numbered with the block numbers 1, 17, 33, 3, 19, 35, 43, 5, . . . are successively arranged rightward along successive rows.

Even if the pixel blocks 1 to 48 thus arranged are subjected to a burst error while being transmitted over the transmission path 60, as described below, the error will not be concentrated on pixel blocks in a certain area after the pixel blocks 1 to 48 are rearranged back to the original image G. The error will be dispersed or distributed over the entire arrangement of the original image G.

Then, the error-detecting encoder 55 adds a transmission error-detecting code such as a CRC code or the like to each of the pixel blocks that have been arranged, and sends the pixel blocks successively in a given sequence to the modulator 56. In this embodiment, the pixel block matrix of the image G shown in FIG. 3 is scanned rightward from the upper left corner along successive rows, and the pixel blocks are sent in the scanned sequence to the modulator 56.

The modulator 56 modulates the pixel blocks into respective signals matching the transmission path 60 and successively transmits the signals to the transmission path 60.

The demodulator 71 in the receiving device 70 successively receives and demodulates the signals transmitted from the transmitting device 50 over the transmission path 60.

Thereafter, the error-detecting decoder 72 determines whether an error has occurred in each of the demodulated pixel blocks during transmission, and stores the block number of any pixel block that has suffered a transmission error into the block identifier memory 73.

The pixel block rearranging unit 74 stores the demodulated pixel blocks in its memory. When the pixel block rearranging unit 74 stores all the pixel blocks corresponding to one image in its memory, it rearranges the pixel blocks into the arrangement of the original image G according to the rules stored in the rule table 75.

Specifically, the pixel block rearranging unit 74 temporarily stores the pixel blocks in the arrangement shown in FIG. 3, and then rearranges the stored pixel blocks, which correspond to one image, back to the arrangement before they were arranged by the pixel block dispersing unit 53. The rules stored in the rule table 75 are the same as the rules stored in the rule table 54. Since the pixel blocks are rearranged according to the rules stored in the rule table 75, they are arranged again in the matrix that makes up the original image G as shown in FIG. 2.

Then, the pixel blocks thus rearranged are successively decoded by the information source decoder 76, and the decoded pixel blocks are delivered through the image data interpolator 77 to the image output unit 78. The image output unit 78 displays the original image G represented by the data of the pixel blocks on the screen of an image display or the like.

If a transmission error has occurred in any of the pixel blocks, then the image data interpolator 77 interpolates the data of that pixel block by referring to the data stored in the block identifier memory 73.

Figure 4:
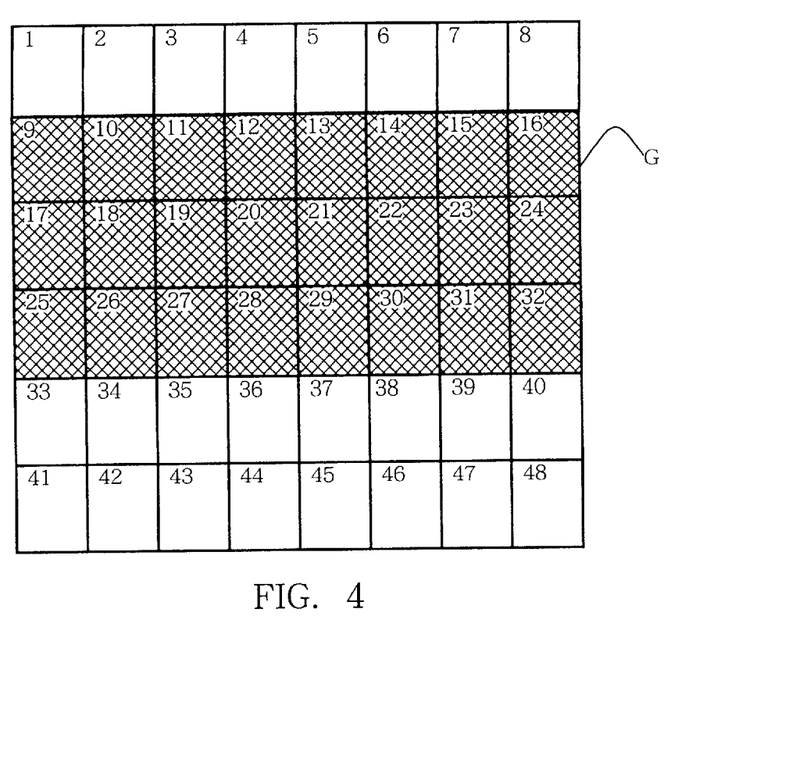
FIG. 4 is a diagram showing the manner in which the blocks shown in FIG. 2 suffer a burst error.

The data of a pixel block which has suffered a transmission error are interpolated using the data of other pixel blocks adjacent thereto. If the image blocks were not arranged as described above prior to transmission and a burst error occurred in the pixel blocks 9 to 32, as shown hatched in FIG. 4, in a certain area during transmission, then those pixel blocks in the area could not be interpolated using many of the data of normal pixels adjacent thereto. Particularly, it would be impossible to interpolate the pixel blocks 17 to 24 as the normal pixels adjacent thereto would not be available.

Figure 5:
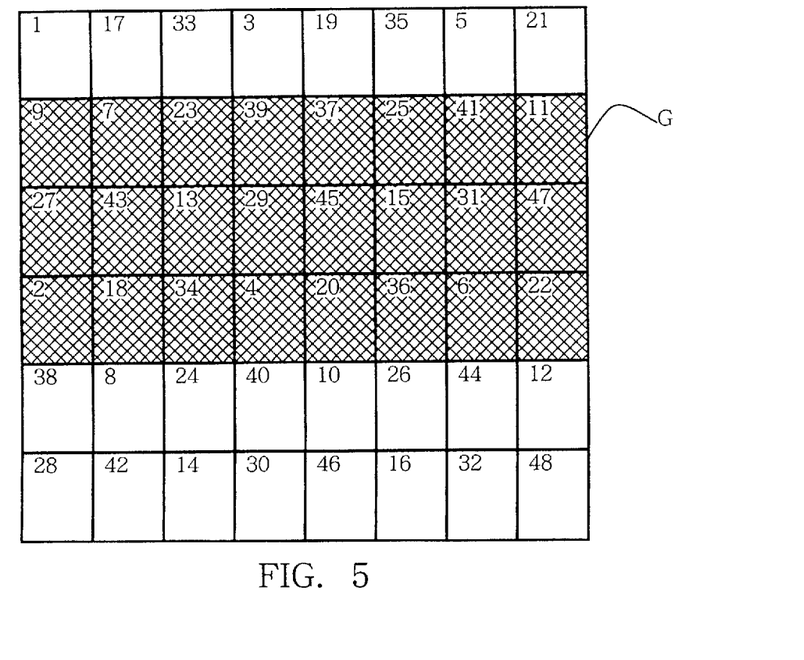
FIG. 5 is a diagram showing the manner in which the blocks shown in FIG. 3 suffer a burst error.
Figure 6:
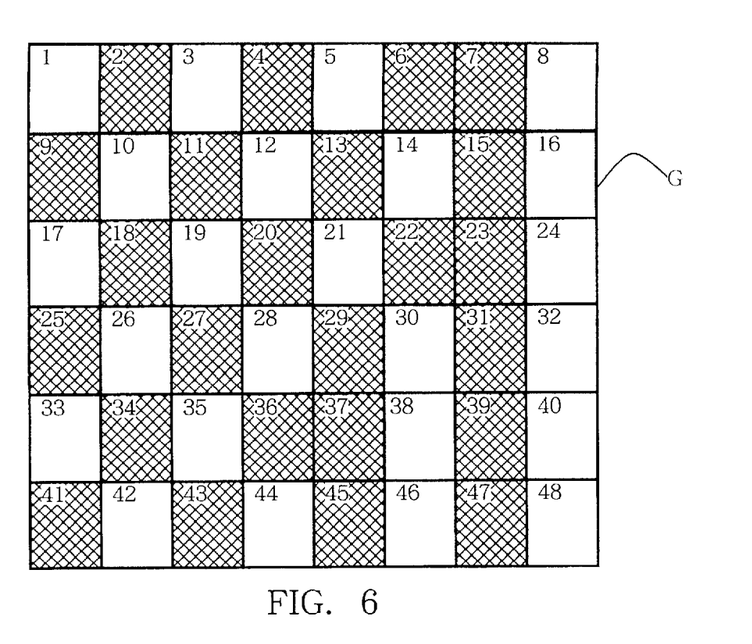
FIG. 6 is a diagram showing the manner in which the burst error shown in FIG. 5 is dispersed.

According to the present invention, the pixel blocks are arranged so as to be placed in a different order from the arrangement representing the original image G and then the pixel blocks are transmitted, and the received pixel blocks are rearranged back into the original arrangement for interpolation. Even if a burst error occurred in the pixel blocks in a certain concentrated area as shown hatched in FIG. 5, during transmission, the received pixel blocks are rearranged to be in the arrangement of original image and the pixel blocks which suffer the burst error are dispersed over the arrangement as shown in FIG. 6, thereby, an interpolation process is effected on the dispersed pixel blocks which suffer the burst error.

Therefore, the pixel blocks which suffer the burst error can be interpolated using many of the data of normal pixel blocks adjacent thereto. As a consequence, the original image G can be reproduced with high quality and outputted to the image output unit 78.

Various known interpolation processes can be used to interpolate the data of any pixel block that has suffered a transmission error. For example, a linear or curve equation may be derived from the pixel values of normal pixel blocks which are adjacent to the pixel block that has suffered a transmission error, and the derived linear or curve equation may be calculated to estimate data of the pixel block that has suffered a transmission error. Alternatively, pixel values of normal pixel blocks which are adjacent to the pixel block that has suffered a transmission error may be weighted depending on distances or directions, and a weighted mean of the weighted pixel values may be determined to estimate data of the pixel block that has suffered a transmission error. According to some interpolation processes, normal pixel blocks which are not positioned directly adjacent to, but positioned closely to the pixel block that has suffered a transmission error may be used to interpolate that pixel block.

The rules for arranging the pixel blocks are optional insofar as those pixel blocks which are adjacent to each other in the arrangement of the original image will be placed so that they may be transmitted as far from each other as possible. Although the pixel blocks should preferably be transmitted as far from each other as possible in order to avoid adverse effects of transmission errors, it is also preferable to arrange the pixel blocks such that they will be transmitted as closely to each other as possible in order to quickly rearrange the pixel blocks back in the arrangement of the original image. Therefore, these two contradictory requirements should carefully be taken into consideration in determining how far the pixel blocks are to be arranged for transmission.

The sequence in which the pixel blocks are transmitted from the transmitting device 50 to the receiving device 70 is also optional. The sequence may be determined in association with the above arranging rules such that a burst error will not be concentrated on pixel blocks in a certain area.

In the illustrated embodiment, the rules for arranging the pixel blocks are stored in the rule tables 54, 75 which are included in the transmitting device 50 and the receiving device 70, respectively. However, the block numbers which identify the arrangement of the pixel blocks in the original image G may be employed so as to dispense with the rule table 75 in the receiving device 70. According to such a modification, the transmitting device 50 successively transmits arranged pixel blocks with respective block numbers added thereto, and the receiving device 70 successively receives the transmitted pixel blocks corresponding to one image and rearranges the pixel blocks according to the block numbers for reproducing the pixel blocks in the arrangement of the original image G.

The size of each pixel block may be selected as desired. For example, each pixel block may be composed of 4×4 pixels, 16×16 pixels, or the like.

If the data of pixel blocks which have been encoded by the information source encoder need to be compressed, then the data may be further quantized, entropy-coded, and transmitted, and the received data may be entropy-decoded, inversely quantized, and reproduced.

In the image transmission system according to the present invention, the transmitting device arranges pixel blocks of one image to be distributed in a different order from the arrangement representing the original image and transmits the arranged pixel blocks, and the receiving device receives the transmitted pixel blocks and rearranges the pixel blocks back into the arrangement of the original image. Therefore, even if a burst error occurs in a certain area of the pixel blocks while the pixel blocks are being transmitted, the pixel blocks which have suffered an error are dispersed at separated places and are surrounded by the pixel blocks which are normally transmitted when the pixel blocks are rearranged back into the arrangement of the original image, thereby, the pixel blocks which have suffered an error can be interpolated based on the data of normal pixel blocks adjacent thereto for reproducing the original image with high quality.

Although certain preferred embodiments of the present invention have been shown and described in detail, it should be understood that various changes and modifications may be made therein without departing from the scope of the appended claims.

What is claimed is:

1. An image transmission system for transmitting an image, said image transmission system comprising:
   a transmitting device comprising:
   a dividing means for dividing the image into a plurality of blocks so as to obtain an original arrangement of blocks;
   a dispersing means for dispersing the plurality of blocks based upon predetermined rules so as to obtain a dispersed arrangement of blocks; and
   a transmitting means for transmitting the plurality of blocks, as arranged in the dispersed arrangement of blocks, in a successive manner; and
   a receiving device comprising:
   a receiving means for receiving the plurality of blocks, transmitted by said transmitting means, in a successive manner;
   a rearranging means for rearranging the plurality of blocks received by said receiving means based upon said predetermined rules so as to obtain the original arrangement of blocks; and
   an interpolating means for interpolating any of the plurality of blocks received by said receiving means, which have experienced transmission errors, based upon blocks adjacent thereto in the original arrangement of blocks.

2. An image transmission system as claimed in claim 1, wherein said transmitting means further comprises image input means for inputting the image and said receiving device further comprises image output means for reproducing and outputting the image based upon the original arrangement of blocks obtained by said rearranging means and based upon the blocks interpolated by said interpolating means.

3. An image transmission system as claimed in claim 2, wherein said image input means comprises a video camera and said image output means comprises an image display unit.

4. An image transmission system as claimed in claim 1, wherein the original arrangement of blocks and the dispersed arrangement of blocks are each in the form of a matrix and wherein said predetermined rules comprise the selection of blocks in a downward and successive manner along every other column and every other row of the matrix.

5. An image transmission system as claimed in claim 1, wherein said transmitting device further comprises a first rule table and said receiving device further comprises a second rule table, and wherein said predetermined rules are stored in said first rule table and said second rule table.

6. An image transmission system for transmitting an image, said image transmission system comprising:
   a transmitting device comprising:
   a dividing means for dividing the image into a plurality of blocks so as to obtain an original arrangement of blocks and for assigning a block number to each of the plurality of blocks so as to identify a location of each of the plurality of blocks in the original arrangement of blocks;
   a dispersing means for dispersing the plurality of blocks based upon predetermined rules so as to obtain a dispersed arrangement of blocks; and
   a transmitting means for transmitting the plurality of blocks, as arranged in the dispersed arrangement of blocks, in a successive manner; and
   a receiving device comprising:
   a receiving means for receiving the plurality of blocks, transmitted by said transmitting means, in a successive manner;
   a rearranging means for rearranging the plurality of blocks received by said receiving means based upon the block numbers, so as to obtain the original arrangement of blocks; and
   an interpolating means for interpolating any of the plurality of blocks received by said receiving means, which have experienced transmission errors, based upon blocks adjacent thereto in the original arrangement of blocks.

7. An image transmission system as claimed in claim 6, wherein said transmitting means further comprises image input means for inputting the image and said receiving device further comprises image output means for reproducing and outputting the image based upon the original arrangement of blocks obtained by said rearranging means and based upon the blocks interpolated by said interpolating means.

8. An image transmission system as claimed in claim 7, wherein said image input means comprises a video camera and said image output means comprises an image display unit.

9. An image transmission system as claimed in claim 6, wherein the original arrangement of blocks and the dispersed arrangement of blocks are each in the form of a matrix and wherein said predetermined rules comprise the selection of blocks in a downward and successive manner along every other column and every other row of the matrix.

10. An image transmission system as claimed in claim 6, wherein said transmitting device further comprises a rule table in which said predetermined rules are stored.

11. An image transmission method for transmitting an image, said image transmission method comprising:
    dividing the image into a plurality of blocks so as to obtain an original arrangement of blocks;
    dispersing the plurality of blocks based upon predetermined rules so as to obtain a dispersed arrangement of blocks;
    transmitting the plurality of blocks, as arranged in the dispersed arrangement of blocks, in a successive manner;
    receiving the plurality of blocks, transmitted by said transmitting step, in a successive manner;
    rearranging the plurality of blocks received based upon the predetermined rules so as to obtain the original arrangement of blocks; and
    interpolating any of the plurality of blocks received by said receiving step, which have experienced transmission errors, based upon blocks adjacent thereto in the original arrangement of blocks.

12. An image transmission method as claimed in claim 11, wherein said image transmission method further comprises inputting the image, and reproducing and outputting the image based upon the original arrangement of blocks obtained by said rearranging step and based upon the blocks interpolated by said interpolating step.

13. An image transmission method as claimed in claim 12, wherein said inputting the image step is performed by using a video camera and said reproducing and outputting the image step is performed by using an image display unit.

14. An image transmission method as claimed in claim 11, wherein the original arrangement of blocks and the dispersed arrangement of blocks are each in the form of a matrix and wherein said predetermined rules comprise the selection of blocks in a downward and successive manner along every other column and every other row of the matrix.

15. An image transmission method as claimed in claim 11, wherein said image transmission method further comprises the storing of the predetermined rules in both a first and second rule table.

16. An image transmission method for transmitting an image, said image transmission method comprising:

dividing the image into a plurality of blocks so as to obtain an original arrangement of blocks and assigning a block number to each of the plurality of blocks so as to identify a location of each of the plurality of blocks in the original arrangement of blocks;

dispersing the plurality of blocks based upon predetermined rules so as to obtain a dispersed arrangement of blocks;

transmitting the plurality of blocks, as arranged in the dispersed arrangement of blocks, in a successive manner;

receiving the plurality of blocks, transmitted by said transmitting step, in a successive manner;

rearranging the plurality of blocks received based upon the block numbers so as to obtain the original arrangement of blocks; and interpolating any of the plurality of blocks received by said receiving step, which have experienced transmission errors, based upon blocks adjacent thereto in the original arrangement of blocks.

17. An image transmission method as claimed in claim 16, wherein said image transmission method further comprises inputting the image, and reproducing and outputting the image based upon the original arrangement of blocks obtained by said rearranging step and based upon the blocks interpolated by said interpolating step.

18. An image transmission method as claimed in claim 17, wherein said inputting the image step is performed by using a video camera and said reproducing and outputting the image step is performed by using an image display unit.

19. An image transmission system as claimed in claim 16, wherein the original arrangement of blocks and the dispersed arrangement of blocks are each in the form of a matrix and wherein said predetermined rules comprise the selection of blocks in a downward and successive manner along every other column and every other row of the matrix.

20. An image transmission method as claimed in claim 16, wherein said image transmission method further comprises the storing of the predetermined rules in a rule table.

* * * * *